(12) United States Patent
Choi et al.

(10) Patent No.: US 8,477,415 B2
(45) Date of Patent: Jul. 2, 2013

(54) MULTIFUNCTIONAL OPTICAL SHEET HAVING LIGHT SHIELDING PROPERTY

(75) Inventors: Seong Gyu Choi, Anyang (KR); Ki Sung Nam, Cheongju (KR)

(73) Assignee: S-Polytech Co., Ltd. (KR)

( * ) Notice: Subject to any disclaimer, the term of this patent is extended or adjusted under 35 U.S.C. 154(b) by 30 days.

(21) Appl. No.: 13/274,667

(22) Filed: Oct. 17, 2011

(65) Prior Publication Data
US 2012/0194902 A1 Aug. 2, 2012

(30) Foreign Application Priority Data

Feb. 1, 2011 (KR) .................. 10-2011-0010139

(51) Int. Cl.
*F21V 9/04* (2006.01)
(52) U.S. Cl.
USPC ........................................ 359/361

(58) Field of Classification Search
None
See application file for complete search history.

(56) References Cited

U.S. PATENT DOCUMENTS 7,638,184 B2 * 12/2009 Yaoita et al. .................. 428/213
2007/0206303 A1 * 9/2007 Sumino et al. ................ 359/885

FOREIGN PATENT DOCUMENTS

JP 2003-342046 A 12/2003

* cited by examiner

*Primary Examiner* — Derek S Chapel
(74) *Attorney, Agent, or Firm* — Harness, Dickey & Pierce, P.L.C.

(57) ABSTRACT

A multifunctional optical sheet having a light shielding property is provided, which includes polycarbonate, a metal mixture, and a pigment. Since the metal mixture is composed of chrome, iron, and nickel, the visible light transmittance is improved, and the infrared rays are intercepted.

3 Claims, 2 Drawing Sheets

A: Graph showing infrared transmittance of multifunctional optical sheet having light shielding property B: Graph showing infrared transmittance of polycarbonate sheet in the related art A: Graph showing infrared transmittance of multifunctional optical sheet having light shielding property B: Graph showing infrared transmittance of polycarbonate sheet in the related art C: Graph showing thermal insulating effect of multifunctional optical sheet having light shielding property D: Graph showing thermal insulating effect of polycarbonate sheet in the related art

MULTIFUNCTIONAL OPTICAL SHEET HAVING LIGHT SHIELDING PROPERTY

CROSS-REFERENCE TO RELATED APPLICATION

This application is based on and claims priority from Korean Patent Application No. 10-2011-0010139, filed on Feb. 1, 2011 in the Korean Intellectual Property Office, the disclosure of which is incorporated herein in its entirety by reference.

BACKGROUND OF THE INVENTION

1. Field of the Invention

The present invention relates to a multifunctional optical sheet having a light shielding property. More particularly, the present invention relates to a multifunctional optical sheet having a light shielding property, which includes polycarbonate, a metal mixture, that is composed of chrome, iron, and nickel, and a pigment, and which can improve visible light transmittance while intercepting infrared rays.

2. Description of the Prior Art

In general, polycarbonate (PC) sheets have been widely used in place of glass as construction materials for skylights, lighting panels for buildings, roofing materials, canopy, windows and doors or safety glass, swimming pools, roofs of gymnasiums, greenhouses, or soundproofing walls.

Since such a polycarbonate sheet has superior transparency, strength, and scratchproof, it is formed on an upper surface and a lower surface of a glass fiber layer and serves to supplement the mechanical strength of the glass fiber layer.

Sunlight is briefly divided into ultraviolet rays (UV), visible light rays (VIS), and infrared rays (IR). Specifically, the sunlight includes about 6% of ultraviolet rays, about 46% of visible light rays, and about 48% of infrared rays, and thus almost a half of the sunlight is occupied by the infrared rays which do not contribute to the lighting, but have a thermal effect. The infrared rays are classified into near infrared rays (0.75 to 3 μm), infrared rays (3 to 25 μm), and far infrared rays (exceeding 25 μm) in accordance with their wavelengths. The infrared rays have the feature in that they have a strong thermal effect in comparison to the visible light rays or ultraviolet rays, and thus are also called heat rays. The radiant heat that is delivered from the sun or a heating element to an indoor space is caused by the infrared rays.

However, a polycarbonate sheet in the related art that has been used for an outdoor structure has problems in that since it has a low infrared shielding effect, the internal temperature of the structure is increased especially on summer time, and sheet bending occurs due to thermal expansion and shrinkage.

In order to solve the problems, various methods for obtaining thermal insulation effects, such as using a milky white polycarbonate sheet, laminating an infrared reflection film on one surface of a polycarbonate sheet, and coating an infrared reflection layer on one surface of a polycarbonate sheet, have been used.

However, in the case of using the milky white polycarbonate sheet, it easily gets dirty, and its external appearance becomes unclean. In the case of forming an infrared reflection film or an infrared reflection layer, a separate lamination process or deposition process for forming the infrared reflection film or infrared reflection layer is required to deteriorate the productivity. Further, the infrared reflection layer easily peels off and is easily worn away to shorten the period of use.

SUMMARY OF THE INVENTION

Accordingly, the present invention has been made to solve the above-mentioned problems occurring in the related art while advantages achieved by the related art are maintained intact.

An embodiment of the present invention proposes a multifunctional optical sheet having a light shielding property, which has a superior infrared shielding effect through mixing of a polycarbonate resin and a metal mixture that indicates the infrared shielding effect, even without forming an infrared reflection film or an infrared reflection layer on a polycarbonate sheet through a separate process.

In one aspect of the present invention, there is provided a multifunctional optical sheet having a light shielding property, which includes polycarbonate, a metal mixture, and a pigment.

The multifunctional optical sheet having a light shielding property according to the aspect of the present invention may include 93.5 to 98.99 parts by weight of the polycarbonate, 0.01 to 1.5 parts by weight of the metal mixture, and 1.0 to 5.0 parts by weight of the pigment.

In the multifunctional optical sheet having a light shielding property according to the aspect of the present invention, the metal mixture may be a mixture of chrome, iron, and nickel.

In the multifunctional optical sheet having a light shielding property according to the aspect of the present invention, a particle size of the metal mixture may be 1 to 5 μm.

Since the multifunctional optical sheet having a light shielding property according to the aspect of the present invention can be manufactured through once extrusion after mixing the polycarbonate resin and the metal mixture having the infrared shielding effect, the process is simplified and the productivity is greatly improved.

Further, the infrared reflection effect by the metal mixture having the infrared shielding effect is superior to improve the shadow effect, the lighting is improved due to the improvement of the transmittance of the visible light rays, and the sheet bending due to the thermal expansion and shrinkage can be prevented.

Further, since the sheet is manufactured by extruding a composition that is prepared by mixing the polycarbonate resin and the metal mixture having the infrared shielding effect rather than by depositing a separate reflection layer on the sheet surface, the infrared reflection layer does not easily peel off and is not easily worn away to improve the period of use.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
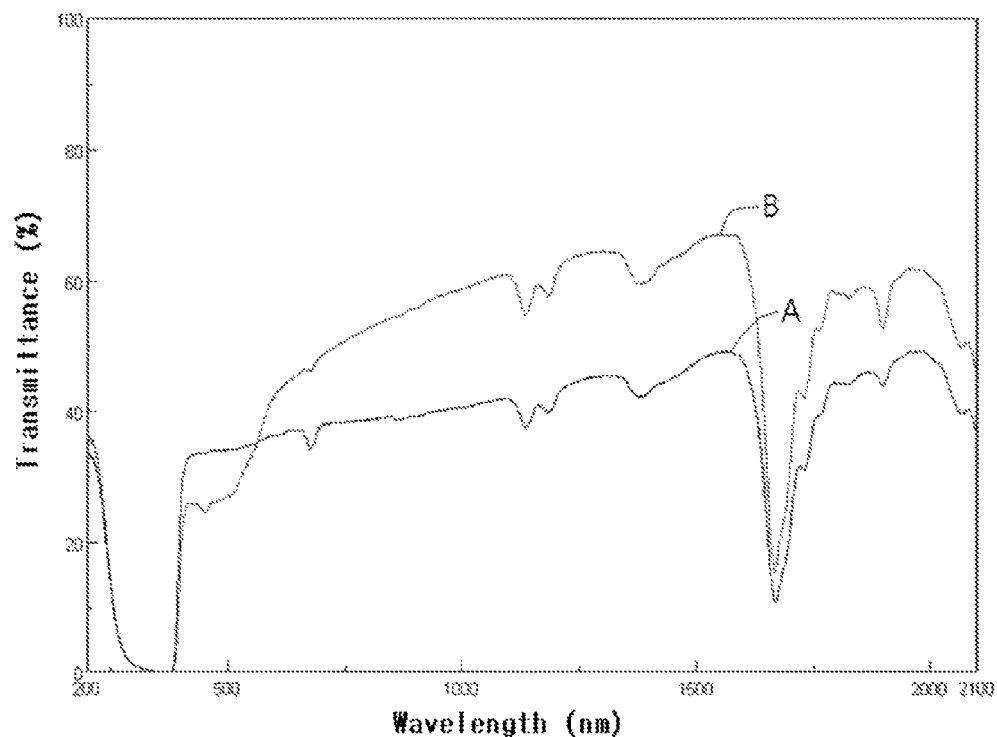
FIG. 1 is a graph illustrating infrared transmittances of a multifunctional optical sheet having a light shielding property according to an embodiment of the present invention and a polycarbonate sheet used in the related art.

Hereinafter, preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

A multifunctional optical sheet having a light shielding property according to an embodiment of the present invention includes polycarbonate, a metal mixture, and a pigment, and more preferably, the multifunctional optical sheet having a light shielding property according to an embodiment of the present invention includes 93.5 to 98.99 parts by weight of the polycarbonate, 0.01 to 1.5 parts by weight of the metal mixture, and 1.0 to 5.0 parts by weight of the pigment.

As described above, 93.5 to 98.99 parts by weight of the polycarbonate resin is added, and serves as a base material of the multifunctional optical sheet having a light shielding property. In general, any carbonate resin, which has been commonly used for manufacturing a polycarbonate sheet in the field to which the present invention pertains, can be used, but is not particularly limited.

As described above, 0.01 to 1.5 parts by weight of the metal mixture is added, and serves to shield infrared rays. It is preferable that the metal mixture is a mixture of chrome, iron, and nickel, and the mixing ratio of chrome, iron, and nickel is 1:1:1.

The metal mixture may be used as a reflection plate due to its property of well reflecting infrared rays, ultraviolet rays, and electromagnetic waves. In this embodiment of the present invention, the metal mixture is finely pulverized to a micrometer size, and is mixed with the polycarbonate resin.

It is preferable that the particle size of the metal mixture is 1 to 5 μm, which is a size for heightening the infrared shielding effect and obtaining superior visible light transmittance. If the particle size of the metal mixture is smaller than 1 μm, the infrared shielding effect is lowered, while if the particle size of the metal mixture exceeds 5 μm, the infrared shielding effect becomes high, but the visible light transmittance may be lowered.

On the other hand, shadow effects by places, in which the multifunctional optical sheet having a light shielding property is used, may differ, and for this, the content of the metal mixture may be appropriately adjusted.

As described above, 1.0 to 5.0 parts by weight of the pigment is added, and serves as a colorant for giving colors to the multifunctional optical sheet having a light shielding property. The kind and the content of the pigment may be appropriately adjusted according to colors that are required by places in which the multifunctional optical sheet having a light shielding property is installed.

The multifunctional optical sheet having a light shielding property according to an embodiment of the present invention can be manufactured through an extrusion process only once after mixing the polycarbonate resin, the metal mixture, and the pigment. In this case, it is preferable to mix 93.5 to 98.99 parts by weight of the polycarbonate, 0.01 to 1.5 parts by weight of the metal mixture, and 1.0 to 5.0 parts by weight of the pigment, and in the case of performing the mixing with the above-described mixing ratio, the infrared shielding effect becomes most superior.

On the other hand, it is preferable that the multifunctional optical sheet having a light shielding property is formed with thickness of 10 to 15 mm.

Experimental Example

FIG. 1 is a graph illustrating infrared transmittances of a multifunctional optical sheet having a light shielding property according to an embodiment of the present invention and a polycarbonate sheet used in the related art.

Here, a multifunctional optical sheet having a light shielding property was formed with a thickness of 15 mm by forming a composition through mixing of 96 parts by weight of polycarbonate, 1 parts by weight of a metal mixture, which has a particle size of 2.5 μm, and in which chrome, iron, and nickel are mixed with a mixing ratio of 1:1:1, and then extruding the composition through an extruder with the cylinder temperature of 280° C. and the dye temperature of 250° C.

According to the multifunctional optical sheet having a light shielding property formed as above, as illustrated in FIG. 1, the transmittance of near infrared rays of about 700 to 1600 nm was only about 20% (see "A" in FIG. 1), which was considerably lower than that of the polycarbonate sheet in the related art (about 80% or more, see "B" in FIG. 1), and about 80% or more of the near infrared rays were intercepted.

Figure 2:
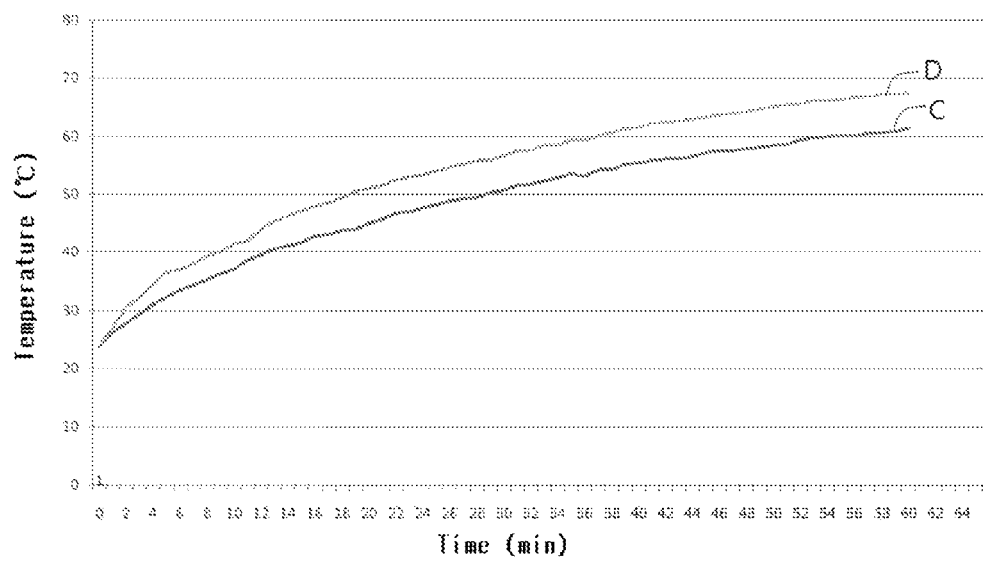
FIG. 2 is a graph illustrating thermal insulating effects of a multifunctional optical sheet having a light shielding property according to an embodiment of the present invention and a polycarbonate sheet in the related art.

Further, FIG. 2 is a graph illustrating thermal insulating effects of a multifunctional optical sheet having a light shielding property according to an embodiment of the present invention and a polycarbonate sheet in the related art. As the result of experiments of a multifunctional optical sheet having a light shielding property manufactured in the above-described method and the polycarbonate sheet in the related art under the sunlight using a temperature change tester, the internal temperature of the multifunctional optical sheet having a light shielding property (see "C" in FIG. 2) was lowered for about 6 to 8° C. in comparison to the polycarbonate sheet in the related art, and thus the thermal insulating effect was great.

As described above, the multifunctional optical sheet having a light shielding property according to the present invention contains mixed particles of chrome, iron, and nickel, and thus has superior infrared shielding effect and thermal insulating effect in comparison to the polycarbonate sheet in the related art.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A multifunctional optical sheet having a light shielding property, comprising polycarbonate, a metal mixture, and a pigment; the multifunctional optical sheet having a light shielding property wherein the multifunctional optical sheet comprises 93.5 to 98.99 parts by weight of the polycarbonate, 0.01 to 1.5 parts by weight of the metal mixture, and 1.0 to 5.0 parts by weight of the pigment.

2. The multifunctional optical sheet having a light shielding property according to claim 1, wherein the metal mixture is a mixture of chrome, iron, and nickel.

3. The multifunctional optical sheet having a light shielding property according to claim 1, wherein a particle size of the metal mixture is 1 to 5 μm.

* * * * *